United States Patent [19]

Naruse et al.

[11] 4,100,577
[45] Jul. 11, 1978

[54] APPARATUS FOR OPTICALLY READING SIGNAL INFORMATION RECORDED ON A REFLECTIVE RECORD MEDIUM SURFACE

[75] Inventors: Yohsuke Naruse; Mikio Sugiki, both of Tokyo, Japan

[73] Assignee: Sony Corporation, Tokyo, Japan

[21] Appl. No.: 743,010

[22] Filed: Nov. 18, 1976

[30] Foreign Application Priority Data

Nov. 20, 1975 [JP] Japan ................. 50-139525

[51] Int. Cl.$^2$ .................... H04N 5/76; G11B 7/12
[52] U.S. Cl. ........................ 358/128; 179/100.3 V; 250/201; 250/225
[58] Field of Search ................ 358/128, 130; 179/100.3 V; 250/201, 202, 203 R, 225

[56] References Cited

U.S. PATENT DOCUMENTS

| | | | |
|---|---|---|---|
| 3,876,841 | 4/1975 | Kramer et al. | 358/130 |
| 3,969,576 | 7/1976 | Boonstra | 179/100.3 V |
| 3,974,327 | 8/1976 | VanDijk | 179/100.3 V |
| 3,992,575 | 11/1976 | Velzel | 179/100.3 V |
| 4,027,330 | 5/1977 | Maslowski et al. | 179/100.3 V |

Primary Examiner—Raymond F. Cardillo, Jr.
Attorney, Agent, or Firm—Lewis H. Eslinger; Alvin Sinderbrand

[57] ABSTRACT

An apparatus for optically reading or playing-back video or other signal information recorded as pits or other variations in a record track on a reflective record medium surface employs a polarized beam splitter by which a laser light beam is split into first and second polarized light beams which are respectively polarized in different polarization directions. The first polarized light beam is directed in a respective optical path so as to be projected against the record track on the record medium surface and reflected from the latter to a photodetector or -sensor developing an output representing the recorded signal information, while the second polarized light beam is directed, in an optical path spaced from that of the first polarized light beam, so as to be projected against the record medium surface and reflected from the latter to control a servo-mechanism by which, for example, proper focusing or positioning of the first polarized light beam in respect to the record track is maintained.

5 Claims, 7 Drawing Figures

APPARATUS FOR OPTICALLY READING SIGNAL INFORMATION RECORDED ON A REFLECTIVE RECORD MEDIUM SURFACE

BACKGROUND OF THE INVENTION

1. Field of the Invention

This invention relates generally to an apparatus for the reading or play-back of signal information recorded on a record medium, and more particularly is directed to improvements in such apparatus of the type in which signal information recorded as variations in a record track on a reflective record medium surface is optically read or played back by projecting a light beam against the record track on the record medium surface for reflection from the latter and detecting the modulation of the reflected light beam resulting from the variations in the record track representing the recorded signal information.

2. Description of the Prior Art

In existing apparatus of the described type, for example, the conventional video disk player, there are employed, in addition to the signal information reading light beam, a tracking servo-control light beam for causing the reading light beam to accurately track or follow the record track which may be spirally formed on a record disk, and a focus servo-control light beam for maintaining focus of the reading light beam on the record disk even when the latter deflects in the direction at right angles to its plane of rotation. Usually, the several light beams are all obtained from a single light source, such as, a laser. In such cases, a single light beam emitted by the light source is split into the several light beams, that is, the reading light beam, tracking servo-control light beam and focus servo-control light beam, by means of a conventional beam splitter so that all of the beams have the same light characteristics. In other words, the conventional beam splitter is merely effective to split the original single light beam into a plurality of light beams which are spatially displaced relative to each other. When the plural light beams are obtained from a single light beam by a conventional beam splitter, and the distances between the plural beams, as reflected from the record medium surface, are made small as is required in the interests of accuracy and of providing a desirably compact signal information reading apparatus, there is considerable leakage of the light beams into each other, that is, it is difficult to individually detect the energy of the light beams as reflected from the record medium surface. Further, under the described conditions, it is difficult to prevent the return of the reflected beams to the laser with the result that full utilization of the laser power cannot be attained and the stability of the laser oscillation is frequently deteriorated.

OBJECTS AND SUMMARY OF THE INVENTION

Accordingly, it is an object of this invention to provide an apparatus for optically reading signal information, as aforesaid and in which the above-mentioned disadvantages of the existing apparatus of that type are avoided.

More specifically, it is an object of this invention to provide an apparatus for optically reading signal information, as aforesaid, and in which plural light beams, as projected against the record medium surface and reflected from the latter, can be perfectly separated from each other.

Still another object is to provide an apparatus, as aforesaid, in which the power loss of a laser or other light source is minimized.

A further object is to provide an apparatus, as aforesaid, in which signal information recorded as variations in a record track on a reflective record medium surface and one or more servo-control signals can be exactly detected without restriction on the spacing between the light beam for reading the information signal and the light beam or beams for effecting servo-control so that such light beams can be disposed close to each other for permitting a compact arrangement of the apparatus.

In accordance with an aspect of this invention, in an apparatus for optically reading video or other signal information recorded as pits or other variations in a record track on a reflective record medium surface, a light beam from a suitable source, such as, a laser, is split into first and second polarized light beams which are respectively polarized in different polarization directions, and the first polarized light beam is directed in a respective optical path so as to be projected against the record track and there reflected from the record medium surface to a photo-detector or sensor developing an output representing the recorded signal information, while the second polarized light beam is directed, in an optical path spaced from that of the first polarized light beam, so as to be projected against the record medium surface and reflected from the latter to develop a servo-control signal by which, for example, proper focusing or positioning of the first polarized light beam in respect to the record track is maintained. By reason of the different directions of polarization of the first and second polarized light beams, the distances between their respective optical paths can be advantageously small for permitting a compact apparatus to be obtained without the danger that leakage between the first and second polarized light beams, particularly as reflected from the record medium surface, will disturb the accuracy of the output representing the recorded signal information or of the servo-control signal, and further without the possibility of return of the reflected light beams to the laser for decreasing the utilization of the power of the latter or the stability of its oscillation.

The above, and other objects, features and advantages of this invention, will become apparent from the following detailed description of illustrative embodiments thereof which is to be read in connection with the accompanying drawings.

DESCRIPTION OF THE PREFERRED EMBODIMENTS

Figure 1:
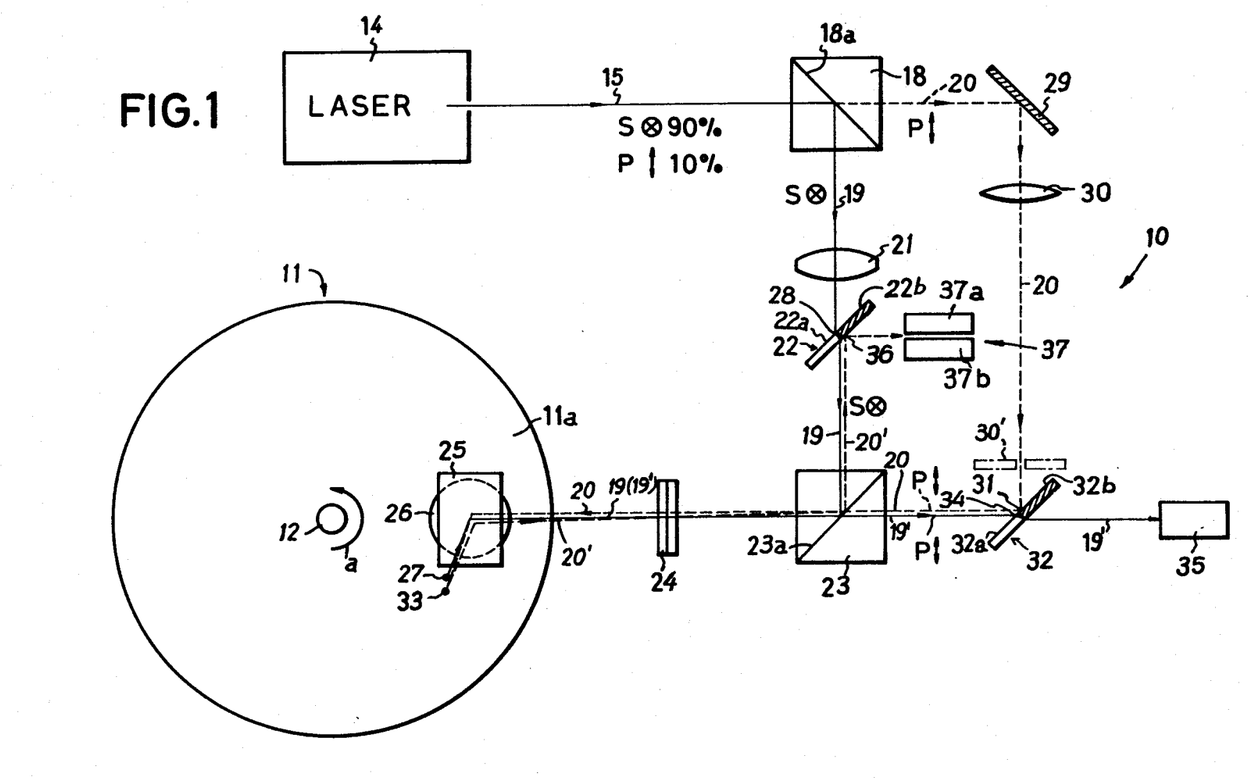
FIG. 1 is a schematic plan view of an apparatus according to an embodiment of this invention for reading recorded signal information on a rotated record disk.
Figure 2:
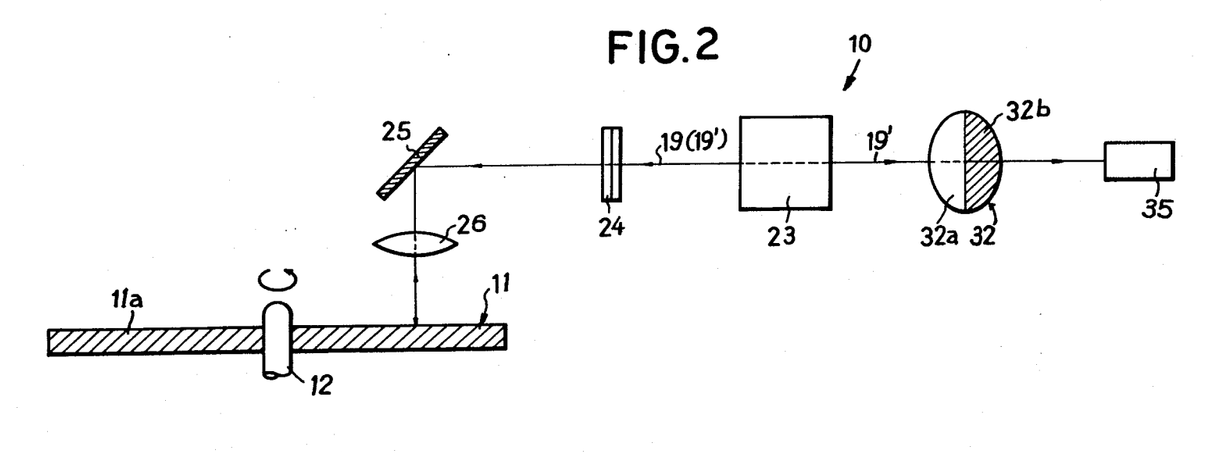
FIG. 2 is a schematic side elevational view of a portion of the apparatus shown on FIG. 1.

Referring to the drawings in detail, and initially to FIGS. 1 and 2, it will be seen that an apparatus 10 according to this invention for optically reading recorded signal information is there shown to be in the form of a video disk player in which the record medium is constituted by a disk 11 mounted, at its center, on a spindle 12, for rotation about the axis of the latter as indicated by the arrow a. As shown diagrammatically on FIG. 3, the recorded signal information may be represented by pits 13 or other variations arranged in closely adjacent, parallel record tracks 13A,13B,13C—etc. on a reflective surface 11a of record disk 11. Although shown to be straight in the diagrammatic illustration of FIG. 3, it will be apparent that record tracks 13A,13B,13C—etc. may be in the form of concentric circles on record disk 11, or may be constituted by successive turns of a continuous spiral on the record disk.

The apparatus 10 according to this invention is shown to include a light source 14 which is preferably in the form of a HeNe laser emitting a single laser light beam 15 which has linear-polarization. The orientation of the laser source 14 around its optical axis is selected so that the linear-polarization of laser light beam 15, as represented by the vector 15a on FIG. 5, will have a vector component 16a in the S-direction, that is, in the direction perpendicular to the plane of the paper on FIG. 1 as indicated at ⊗ which is 90% of the vector 15a, and a vector component 17a in the P-direction, that is, in the direction parallel to the plane of the paper as indicated at ↑, and which is 10% of the vector 15a. In other words, the linear polarization of laser light beam 15 is oriented so that the ratio of its vector component 16a in the S-direction to its vector component 17a in the P-direction is 9:1.

Figures 5, 6, 7:
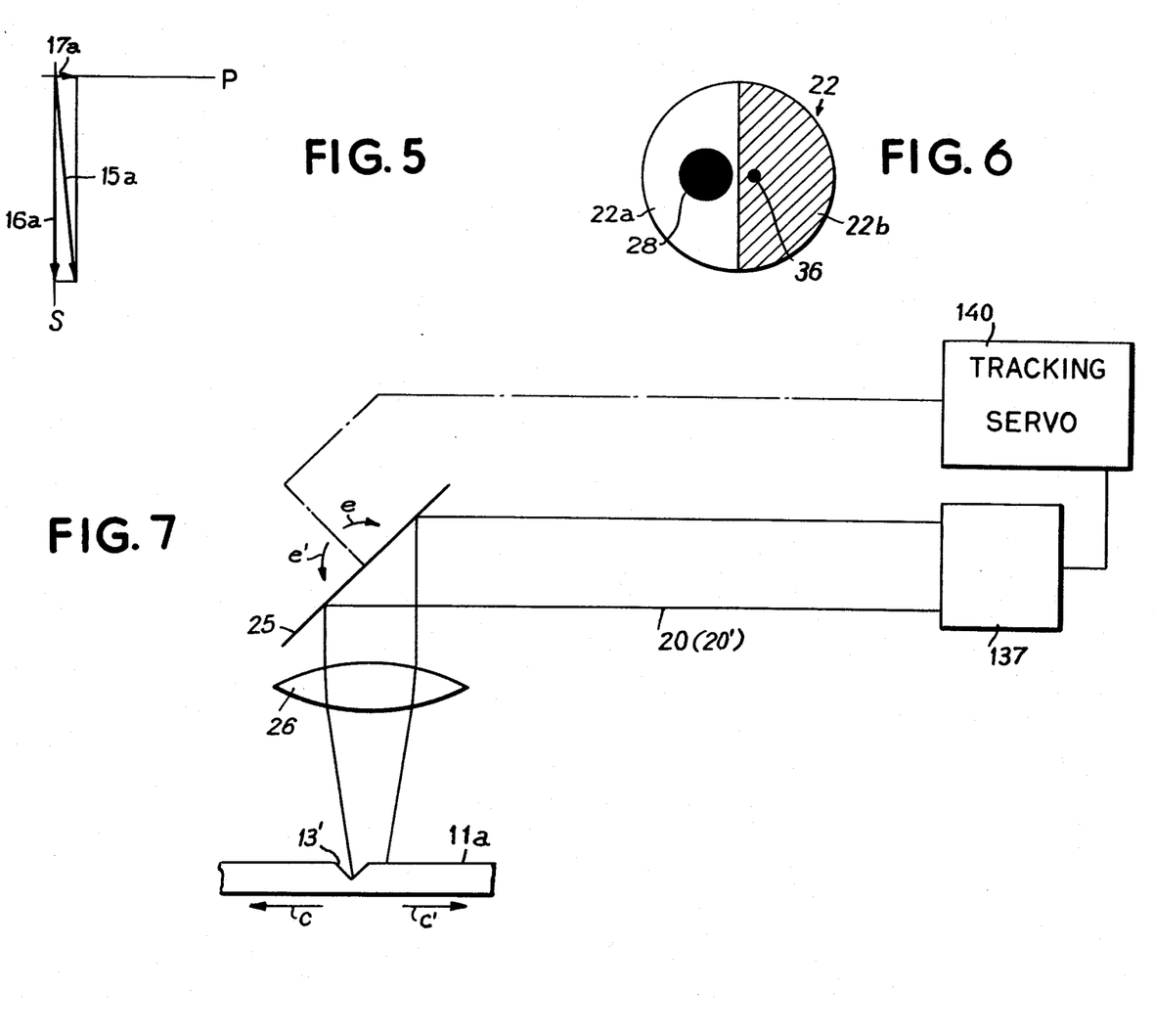
FIG. 5 is a vector diagram showing the vector relationship between a light beam from a laser light source and the polarized light beams which are separated or split therefrom in the apparatus according to this invention.
FIG. 6 is a schematic plan view of a beam splitter included in the apparatus of FIGS. 1 and 2, and which shows the landing spots on such beam splitter of the polarized light beams employed in the apparatus according to this invention.
FIG. 7 is a diagrammatic view similar to that of FIG. 4, but illustrating another embodiment of this invention for effecting tracking servo-control.

The linearly polarized laser light beam 15 is applied to a polarized beam splitter 18 which, as is known, has a reflection surface 18a arranged at 45° 1 to the axis of beam 15 and formed of multiple dielectric films deposited so that the linear-polarization component 16a in the S-direction is reflected from surface 18a, while the linear-polarization component 17a in the P-direction passes or permeates through beam splitter 18 without deflection. Thus, polarized beam splitter 18 is effective to split laser light beam 15 into first and second polarized laser light beams 19 and 20 which are respectively linearly-polarized in the S-direction and the P-direction, and which emerge from beam splitter 18 along orthogonally related paths. In the polarized beam splitter 18, the leakage through reflection surface 18a is less than 1%, that is, light beam 19 polarized in the S-direction will inlude less than 1% of light polarized in the P-direction and, similarly, light beam 20 polarized in the P-direction will include less than 1% of light polarized in the S-direction.

In the illustrated apparatus 10, polarized light beam 19 is to be used for reading signal information recorded on record disk 11 and, for that purpose, is made to travel in a respective optical path constituted by a lens 21, a beam splitter 22, a polarized beam splitter 23 similar to the previously described beam splitter 18, a quarter-wave plate 24, and a movable assembly of a tracking mirror 25 and an objective lens 26 by which polarized light beam 19 is projected substantially perpendicular to surface 11a of the record disk so as to be incident thereon at a landing spot 27. As is shown particularly on FIG. 6, beam splitter 22 may consist of a semi-circular transparent or light-transmitting portion 22a and a semi-circular light-reflective portion 22b, and such beam splitter 22 is arranged substantially at an angle of 45° to the path of light beam 19 emergent from lens 21 so that light beam 19, after passing through lens 21, will land at a spot 28 on light-transmitting portion 22a which is adjacent the diametrical line of separation between the light-transmitting and -reflecting portions 22a and 22b of beam splitter 22. Thus, light beam 19 passes through light-transmitting portion 22a of beam splitter 22 to polarized light beam splitter 23 which, as previously indicated is similar to polarized light beam splitter 18 so that its reflective surface 23a permits the transmission or passage therethrough of light that is linearly-polarized in the P-direction and reflects light that is linearly-polarized in the S-direction.

Since the light beam incident on reflective surface 23a is linearly-polarized in the S-direction, light beam 19 is reflected by surface 23a of polarized beam splitter 23 and passes through quarter-wave plate 24 so as to be circularly polarized by the latter. The circularly polarized light beam 19 is then reflected by mirror 25 so as to pass through objective lens 26 along the optical axis of the latter for focussing by objective lens 26 at surface 11a of the record disk.

Light beam 20 emergent from polarized beam splitter 18 and which is linearly polarized in the P-direction is to be used for servo-control, as hereinafter described in detail, and for that purpose is reflected at right angles by a mirror 29 so as to pass through a lens 30 by which light beam 20 is imaged at a spot 31 on a beam splitter 32. Beam splitter 32 is similar to beam splitter 22 and thus includes a semi-circular light-transmitting portion 32a and a semi-circular light-reflecting portion 32b on which landing spot 31 is located adjacent the diametrical line of separation between portions 32a and 32b. Further, beam splitter 32 is arranged at a 45° angle to the path of light beam 20 incident on light-reflecting portion 32b and is located so that the path of light beam 20, as reflected from portion 32b will be parallel to and spaced a small distance, for example, a distance of 1 mm, from the path of light beam 19 as reflected from surface 23a of polarized beam splitter 23. Since light beam 20 incident on surface 23a of polarized beam splitter 23 is linearly polarized in the P-direction, light beam 20 is transmitted or passes through surface 23a so as to be circularly polarized by quarter wave plate 24 and then reflected by mirror 25 for projection by objective lens 26 to a landing spot 33 on surface 11a which is in trailing relation to the landing spot 27 of light beam 19 considered in relation to the direction of movement of record disk 11 indicated by the arrow a on FIG. 3.

Figure 3:
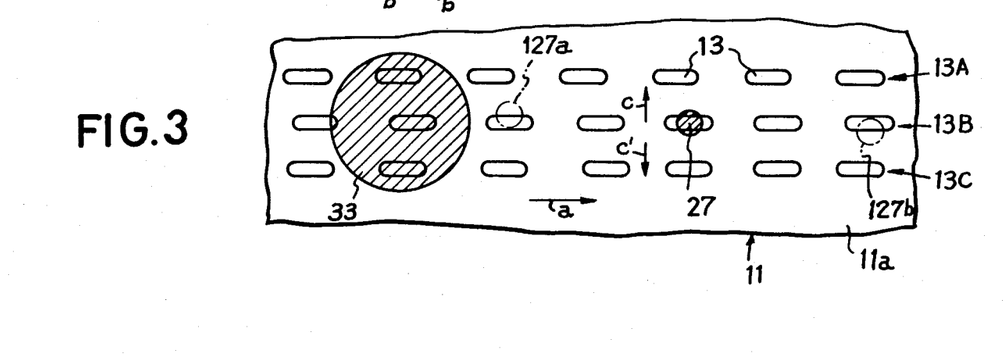
FIG. 3 is a greatly enlarged, schematic plan view of a portion of a record disk illustrating the manner in which signal information is recorded thereon and the relationship thereto of the landing spots of the light beams projected against the record disk in the apparatus of FIGS. 1 and 2.

When the landing spot 27, at which light beam 19 is incident on reflective surface 11a, is disposed to scan one of the record tracks, for example, the record track 13B as shown on FIG. 3, the resulting reflected light beam 19' is modulated by the pits 13 or other variations in the reflective surface representing the signal information recorded in the record track being scanned. The reflected light beam 19' again passes through objective lens 26 and is directed by mirror 25 through quarter-wave plate 24 so that the reflected light beam 19' emergent from quarter-wave plate 24 will be linearly polarized in the P-direction. The foregoing results from the fact that when light originally linearly polarized in the S-direction is passed twice through a quarter-wave plate, the resulting light will be linearly polarized in the P-direction. The reflected light beam 19' emergent from quarter-wave plate 24 and being linearly-polarized in the P-direction is transmitted through surface 23a of polarized beam splitter 23 so as to land at a spot 34 on the light-transmitting portion 32a of beam splitter 32. Accordingly, reflected light beam 19' modulated by signal information recorded on reflective surface 11a of disk 11 passes through light-transmitting portion 32a of beam splitter 32 and impinges on a photo-sensor 35 which may be constituted by a photo-diode, and which is responsive to the modulation of the energy of light beam 19' to provide an electrical output signal representing the recorded signal information.

The light beam 20 incident on reflective surface 11a at landing spot 33 is also reflected from such surface and the resulting reflected light beam 20' passes through objective lens 26 and is reflected by mirror 25 so as to again pass through quarter-wave plate 24. Since light beam 20 was originally linearly polarized in the P-direction, its passage twice through quarter-wave plate 24 results in the reflected light beam 20' emergent from such quarter-wave plate being linearly polarized in the S-direction. Therefore, reflected light beam 20', upon emerging from quarter-wave plate 24, is reflected by surface 23a of polarized beam splitter 23 and emerges from the latter along a path that is parallel to, and spaced a small distance from the path of light beam 19 from beam splitter 22 to beam splitter 23. Accordingly, reflected light beam 20', on emerging from polarized beam splitter 23, is directed at a landing spot 36 on the light-reflecting portion 22b of beam splitter 22 so as to be reflected from the latter to a detector 37 for effecting a servo-control.

In the apparatus 10 according to this invention as illustrated on FIGS. 1 and 2, the polarized light beam 20,20' is employed for effecting focus servo-control, that is, for maintaining the proper focus of polarized light beam 19 at surface 11a of record disk 11 when the latter deflects in the direction at right angles to the plane of its rotation. In order to effect such focus servo-control, detector 37 is shown to include a pair of photo-sensors 37a and 37b which may be constituted by photo-diodes, and which are arranged side-by-side so as to be equally influenced by reflected light beam 20' when objective lens 26 is positioned in respect to surface 11a of the record disk for effecting the proper focus of light beam 19 at surface 11a.

Figure 4:
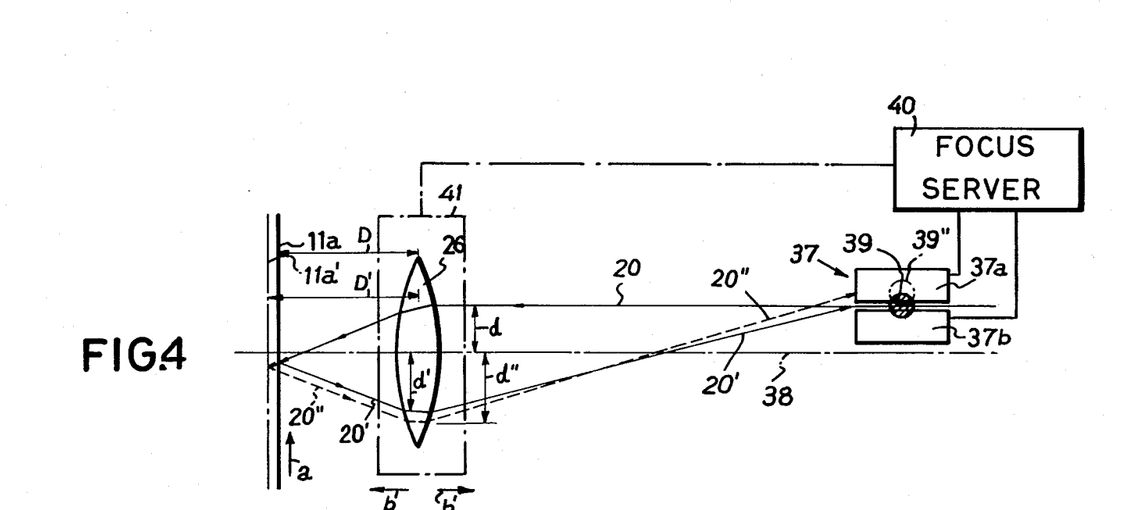
FIG. 4 is a diagrammatic view to which reference will be made in explaining the manner in which one of the light beams projected against the record disk in the apparatus of FIGS. 1 and 2 is employed for effecting focus servo-control.

The operation of the focus servo-control will now be described with reference to diagrammatic FIG. 4 in which, for the sake of simplicity, beam splitters 22 and 23, quarter-wave plate 24 and mirror 25 have been omitted from the optical path of light beam 20,20'. As is shown, light beam 20, in its travel toward surface 11a of the record disk, is incident on objective lens 26 at one side of the optical axis 38 of the objective lens, and more particularly at a distance $d$ from the axis 38. Thus, light beam 20 is refracted by objective lens 26 so as to emerge from the latter at an angle to optical axis 38 and to be incident on reflective surface 11a at such angle. Accordingly, reflected light beam 20' is reflected from surface 11a at an angle equal to the angle of incidence so as to be incident on objective lens 26 at the opposite side of axis 38 and, more particularly, at a distance $d'$ therefrom. Therefore, reflected light beam 20' is again refracted by lens 26 and eventually lands on detector 37 at a spot indicated diagrammatically at 39 on FIG. 4. The various optical elements interposed in the path of light beam 20,20' are positioned so that, when the distance D from objective lens 26 to surface 11a of the record disk is the proper distance for obtaining accurate focussing of the reading light beam 19 at surface 11a, reflected light beam 20' follows the path indicated in full lines on FIG. 4 and the landing spot 39 thereof is centered in respect to photo-sensors 39a and 39b, as shown in full lines, for equally influencing or energizing such photo-sensors which thereby provide equal outputs. However, when the record disk is deflected in the direction at right angles to its plane of rotation so that, for example, when reflective surface 11a moves to the position indicated in broken lines at 11'a on FIG. 4 and thereby provides the increased distance D' from objective lens 26 to surface 11'a, the reflected light beam shown in dotted lines at 20" is then incident on objective lens 26 at an increased distance $d''$ from the optical axis 38 and is subjected to increased refraction so that the landing spot of reflected beam 20" on detector 37 is displaced from its centered position, for example, to the offset position indicated in broken lines at 39", for exerting a stronger influence on photo-sensor 37a than on photo-sensor 37b. Accordingly, photo-sensors 37a and 38b provide different outputs to a focus servo-circuit 40 and the latter responds to such different outputs to provide a corresponding control signal to a moving coil or the like, indicated schematically at 41, and by which objective lens 26 is displaced in the direction of the arrow $b$, that is, in the direction to restore the distance D between the objective lens and surface 11a for ensuring proper focus of reading light beam 19 on surface 11a. Of course, when the record disk is deflected from its proper position relative to objective lens 26 in the direction to reduce the distance D, the refraction of the reflected light beam 20' by objective lens 26 is decreased so that photo-sensor 39b is more strongly influenced by reflected light beam 20' than photo-sensor 37a and focus servo-circuit 40 responds to the resulting difference between the outputs of photo-sensors 37a and 37b for moving objective lens 26 in the direction of the arrow $b'$ on FIG. 4, that is, in the sense for again restoring the correct distance D between objective lens 26 and reflective surface 11a. Thus, objective lens 26 is made to follow deviations of the reflective surface 11a from its proper position so as to maintain correct focus of the reading light beam 19 on such reflective surface.

In order to ensure that modulation of reflected light beam 20' by the pits 13 or other variations in reflective surface 11a representing the recorded signal information will not disturb focus servo-control, the landing spot 33 of light beam 30 on surface 11a is preferably provided with a diameter large enough to embrace a plurality of the record tracks, as shown on FIG. 3. For example, in the case where the distance between adjacent record tracks 13A,13B and 13C is approximately 2μm, the landing spot 27 of the reading light beam 19 may be provided with a diameter of 1μm, while the landing spot 33 of the light beam 20 for effecting focus servo-control is about 6μm. It will be apparent that, when landing spot 33 on surface 11a is relatively large, as aforesaid, reflected light beam 20' is simultaneously influenced by three or four of the pits 13 in adjacent record tracks so that the modulation of reflected light beam 20' by such record pits is averaged to either eliminate or substantially minimize the overall modulation of reflected light beam 20' as received by detector 37.

In an illustrative example of the described embodiment of this invention, laser light beam 15 from laser source 14 has a diameter of 0.6mm and lens 21 has a focal distance of 20mm so as to provide landing spot 28 of light beam 19 on beam splitter 22 with a diameter of 24.6μm. Further, in such example, objective lens 26 is dimensioned so that landing spot 27 of light beam 19 has the diameter of 1μm. On the other hand, lens 30 has a focal distance of 120mm so that landing spot 31 of light beam 20 on beam splitter 32 has a diameter of 160μm, and objective lens 26 focuses light beam 20 for providing its landing spot 33 with the desired diameter of about 6μm. Moreover, in the example being described, the several optical components of apparatus 10 are positioned relative to each other so as to provide a substantially uniform spacing of about 1mm between the parallel paths of light beams 19 and 20 extending from beam splitter 23 to objective lens 26, between the parallel paths of light beam 19 and reflected light beam 20' extending between beam splitters 22 and 23, and between the parallel paths of reflected light beam 19' and light beam 20 extending between beam splitters 23 and 32.

It will be understood that, since the light beams 19 and 20 are linearly-polarized in different directions, such light beams can accurately perform their respective signal reading and focus servo-control functions without restriction on their spatial relation. In other words, although the reflected beams 19' and 20' are at most only spaced apart by a small distance, such reflected beams can be perfectly separated from each other by the polarized beam splitter 23 on the basis of the different directions of polarization of the reflected beams. Further, in the apparatus 10, the reflected beam 20' emergent from polarized beam splitter 23 and the beam 19 traveling from beam splitter 18 to beam splitter 23 are spaced from each other, so that beam splitter 22 can effectively separate and direct reflected beam 20' to detector 37. Thus, there is no danger that reflected beam 20' will be returned to laser light source 14 so as to modulate the original laser beam 15 and/or to disturb the oscillation of the laser light source. Accordingly, the power of the laser can be most effectively utilized.

In the embodiment of the invention described above with reference to FIGS. 1-6, the linearly-polarized light beams 20,20' has been employed for a focus servo-control function, that is, for maintaining proper focus of the reading light beam 19 at the record medium surface 11a even though that surface may deflect or deviate from a normal position in the direction perpendicular to its plane of rotation. However, the present invention may be embodied in an optical reading or playback apparatus also having a tracking servo-control for ensuring that landing spot 27 of light beam 19 will accurately scan the signal information in a selected record track even when record disk 11 deviates in its radial direction from a normal position, for example, in response to vibrations imparted to spindle 12 by a drive motor or the like.

In order to effect tracking servo-control, the light beam 19 which is linearly polarized in the S-direction may be split into a central beam and two side beams by means of a diffraction grating (not shown) interposed in the path of beam 19 between polarized beam splitter 18 and beam splitter 22. In such case, the central beam is used as the signal information reading beam and has the landing spot 27 on surface 11a, as shown on FIG. 3, while the two side beams are directed by the optical system to have the landing spots 127a and 127b which are shown in broken lines to be symmetrically displaced radially inward and outward, respectively, relative to landing spot 27. The side beams reflected from the landing spots 127a and 127b are returned to respective photo-sensors (not shown) which provide equal outputs so long as the landing spot 27 of the central or signal information reading beam is in accurate scanning relation to the record track, as shown on FIG. 3. In other words, during correct scanning of record track 13B by landing spot 27, the beams reflected from landing spots 127a and 127b have equal levels of modulation by the pits 13 in such track 13B. However, if record disk 11 is deflected in the radial direction $c$ relative to landing spot 27, the level of modulation of the side beam reflected from landing spot 127a will be increased and the level of modulation of the side beam reflected from landing spot 127b will be decreased, and the resulting difference between the outputs of the respective photo-sensors may be employed to cause a tracking servo-circuit (not shown) to angularly displace mirror 25 in the direction to restore landing spot 27 to its correct scanning position in respect to record track 13B. Conversely, if record disk 11 is radially deflected in the direction $c'$, the level of modulation of the side beams reflected from landing spot 127b is increased and the level of modulation of the side beam reflected from landing spot 127a is decreased and, in response thereto, mirror 25 is angularly displaced to restore landing spot 27 to the correct scanning position.

In the above modification of the apparatus 10, the linearly-polarized light beam 20,20' continues to exercise the focus servo-control function for the linearly-polarized light beam 19,19' which is split, as described, to perform the signal information reading function and the tracking servo-control function. However, if desired, an apparatus can be provided according to this invention in which the linearly-polarized light beam 19,19'0 functions only to read the recorded signal information, as in the apparatus 10 of FIGS. 1-2, and the linearly polarized light beam 20,20' is employed for the tracking servo-control. For example, as shown on FIG. 7, in which the beam splitters 22, 23 and 32, the quarter-wave plate 24 and the lens 30 acting on beam 20,20' in a manner similar to FIGS. 1 and 2 are all omitted for the sake of simplicity, each record track on record disk 11 is provided with an adjacent parallel tracking groove 13' of V-shaped cross-section. In this case, the various optical elements are arranged so that, when beam 19 properly scans a record track containing signal information, the light beam 20 is directed by mirror 25 and objective lens 26 so as to impinge on surface 11a as shown on FIG. 7. In other words, in the condition of proper tracking by beam 19, beam 20 lands half in a groove 13' and half on the adjacent reflective surface 11a so that only a portion of the energy of incident beam 20 is reflected or returned through objective lens 26 and the other elements in the path of reflected beam 20' to a photo-sensor 137 which replaces the detector 37 of the first described embodiment. In the embodiment of FIG. 7, when disk 11 is radially deflected in the direction of arrow c, the energy in reflected beam 20' is increased and photo-sensor 137 responds thereto to cause a tracking servo-circuit 140 to effect angular displacement of mirror 25 in the direction of the arrow e, whereby beam 20 is returned to the illustrated position relative to groove 13' and beam 19 (not shown) is returned to the correct scanning position relative to the respective record track. Conversely, if disk 11 is deflected in the radial direction c', the energy in reflected beam 20' is decreased, and photo-sensor 137 and servo-circuit 140 respond thereto to angularly displace mirror 25 in the direction e' for restoring the correct tracking condition.

It is also to be noted that, in the apparatus 10 according to this invention, the lens 30 may be replaced by an aperture plate 30', as shown in broken lines on FIG. 1, and which is similarly operative to form an image or landing spot of beam 20 on beam splitter 32. Further, the described beam splitters 22 and 32 on FIG. 1 may be replaced by similarly operating knife-edge mirrors.

Although illustrative embodiments of the invention have been described in detail herein with reference to the accompanying drawings, it is to be understood that the invention is not limited to those precise embodiments or to the described modifications thereof, and that various changes and other modifications may be effected therein by one skilled in the art without departing from the scope or spirit of the invention as defined in the appended claims.

What is claimed is:

1. An apparatus for optically reading signal information recorded as variations in a series of substantially parallel, adjacent record tracks on a reflective record medium surface, comprising a light source emitting a light beam;
polarized beam splitting means receiving said light beam from the light source and splitting the same into first and second polarized light beams which are respectively polarized in first and second polarization directions;
means defining a first optical path in which said first polarized light beam is projected against said record medium surface with a relatively small landing spot on the latter embracing only one of said record tracks and reflected from the record medium surface so as to be modulated by the variations in said one track;
means responsive to energy from the modulated first polarized light beam as reflected from said record medium surface for developing an output signal representing the information signal recorded as variations in said one record track on the record medium surface;
means defining a second optical path spaced from said first optical path and in which said second polarized light beam is projected against said record medium surface with a relatively large landing spot on the latter which spans a plurality of said record tracks so as to be reflected from said record medium surface while avoiding modulation of the reflected second polarized light beam by said variations in each of said record tracks;
objective lens means interposed in said first and second optical paths and being movable toward and away from said record medium surface for varying the focus of said first polarized light beam at said record medium surface and for varying the refraction of the reflected second polarized light beam by said objective lens means, respectively; and
focus-servo means including detecting means receiving the reflected second polarized light beam as refracted by said objective lens means for providing a control signal which varies with said refraction, and means responsive to said control signal for moving said objective lens means in the sense to maintain proper focus of said first polarized light beam at said record medium surface.

2. An apparatus for optically reading signal information recorded as variations in a record track on a reflective record medium surface, comprising a light source emitting a light beam;
polarized beam splitting means receiving said light beam from the light source and splitting the same into first and second polarized light beams which are respectively polarized in first and second polarization directions;
means defining a first optical path in which said first polarized light beam is projected against said record track on the record medium surface and reflected from the latter so as to be modulated by said variations, said means defining said first optical path including objective lens means movable toward and away from the record medium surface and by which said first polarized light beam is focused at said record medium surface;
means responsive to energy from the modulated first polarized light beam as reflected from said record medium surface for developing an output signal representing the information signal recorded as variations in said record track on the record medium surface;
means defining a second optical path spaced from said first optical path and in which said second polarized light beam is projected against said record medium surface and reflected from the latter, said objective lens means being also interposed in said second optical path with said second polarized light beam passing therethrough to and from the record medium surface at distances from the optical axis of said objective lens means so that the refraction by said objective lens means of said second polarized light beam as reflected from said record medium surface varies with changes in the distance from said surface to said objective lens means; and
control means responsive to energy from said second polarized light beam as reflected from said record medium surface for controlling the projection in said first optical path of said first polarized light beam against said record track on the record medium surface, said control means including focus-servo means for moving said objective lens means in the sense to maintain proper focus of said first polarized light beam at said record medium surface and having detecting means receiving the reflected second polarized light beam as refracted by said objective lens means for providing a control signal which varies with said refraction: and in which said record medium surface has additional record tracks thereon extending substantially parallel with, and adjacent to the first mentioned record track; and further in which said means defining said first optical path includes additional lens means cooperating with said objective lens means to provide said first polarized light beam, as projected on said record medium surface, with a relatively small landing spot on the latter embracing only said first record track, and said means defining said second optical path includes respective additional lens means cooperating with said objective lens means to provide said second polarized light beam, as projected on said record medium surface, with a relatively large landing spot on the latter which spans a plurality of said record tracks for avoiding modulation of the reflected second polarized light beam by said variations in each said record track.

3. An apparatus for optically reading signal information recorded as variations in a record track on a reflective record medium surface, comprising a light source emitting a light beam;

polarized beam splitting means receiving said light beam from the light source and splitting the same into first and second polarized light beams which are respectively polarized in first and second polarization directions;

means defining a first optical path in which said first polarized light beam is projected against said record track on the record medium surface and reflected from the latter so as to be modulated by said variations;

means responsive to energy from the modulated first polarized light beam as reflected from said record medium surface for developing an output signal representing the information signal recorded as variations in said record track on the record medium surface;

means defining a second optical path spaced from said first optical path and in which said second polarized light beam is projected against said record medium surface and reflected from the latter;

control means responsive to energy from said second polarized light beam as reflected from said record medium surface for controlling the projection in said first optical path of said first polarized light beam against said record track on the record medium surface;

one of said means defining said first and second optical paths, respectively, including reflecting means by which said first and second polarized light beams, after being split by said beam splitting means, are brought to convergence; and second polarized beam splitting means interposed in said first and second optical paths at said convergence of the first and second polarized light beams for causing said first and second optical paths to have substantially parallel, adjacent portions between said second polarized beam splitting means and said reflective record medium surface.

4. An apparatus according to claim 3; in which a quarter-wave plate is interposed in said substantially parallel, adjacent portions of said first and second optical paths to cause each of said first and second polarized light beams to pass through said quarter-wave plate and the way to and from said reflective record medium surface so that the reflected first and second polarized light beams, as returned to said second polarized beam splitting means, are polarized in said second and first polarization directions, respectively, and are again split to travel in portions of said first and second optical paths emergent from said second polarized beam splitting means and that are adjacent to portions of said second and first optical paths, respectively, incident on said second polarized beam splitting means.

5. An apparatus according to claim 4; further comprising beam splitters for splitting said portions of the first and second optical paths emergent from said second polarized beam splitting means in respect to said adjacent portions of said second and first optical paths, respectively, incident on said second polarized beam splitting means, and for directing the reflected first and second polarized light beams to said means for developing an output signal and to said control means, respectively.

* * * * *